United States Patent
Weaver et al.

(10) Patent No.: US 10,055,582 B1
(45) Date of Patent: Aug. 21, 2018

(54) AUTOMATED DETECTION AND REMEDIATION OF RANSOMWARE ATTACKS INVOLVING A STORAGE DEVICE OF A COMPUTER NETWORK

(71) Applicant: EMC IP Holding Company LLC, Hopkinton, MA (US)

(72) Inventors: James L. Weaver, Southboro, MA (US); Izar Tarandach, Eugene, OR (US); Haral Tsitsivas, Dana Point, CA (US); Srinivasa Maguluri, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 129 days.

(21) Appl. No.: 15/268,862

(22) Filed: Sep. 19, 2016

(51) Int. Cl.
G06F 21/00 (2013.01)
H04L 29/06 (2006.01)
G06F 21/55 (2013.01)
G06F 21/56 (2013.01)
G06F 21/57 (2013.01)
(Continued)

(52) U.S. Cl.
CPC ............ *G06F 21/552* (2013.01); *G06F 7/023* (2013.01); *G06F 15/18* (2013.01); *G06F 21/56* (2013.01); *G06F 21/562* (2013.01); *G06F 21/567* (2013.01); *G06F 21/577* (2013.01); *H04L 63/1433* (2013.01); *G06F 2221/034* (2013.01)

(58) Field of Classification Search
CPC ...... G06F 21/567; G06F 21/56; G06F 21/577; G06F 21/552; G06F 21/562; G06F 15/18; G06F 7/023; H04L 63/1433
See application file for complete search history.

(56) References Cited

U.S. PATENT DOCUMENTS 9,317,686 B1 * 4/2016 Ye ..................... G06F 11/1461
9,635,041 B1 * 4/2017 Warman ................. H04L 41/50
(Continued)

FOREIGN PATENT DOCUMENTS

EP 3038003 A1 6/2016

OTHER PUBLICATIONS

N. Scaife et al., "CryptoLock (and Drop It): Stopping Ransomware Attacks on User Data," 36th International Conference on Distributed Computing Systems, Mar. 12, 2016, pp. 303-312.

*Primary Examiner* — Mohammad A Siddiqi
(74) *Attorney, Agent, or Firm* — Ryan, Mason & Lewis, LLP (57) ABSTRACT

An apparatus in one embodiment comprises a security appliance having a processor coupled to a memory. The security appliance is associated with at least one storage device and comprises a ransomware detector configured to generate a detection score for one or more sets of files stored in the storage device. The ransomware detector comprises a file analyzer configured to compare characteristics relating to a current state of the files with information stored in a file history database, and a detection score generator having a weighting module for applying weights to respective comparison results from the file analyzer in generating the detection score for the one or more sets of files. The ransomware detector is further configured to generate an alert if the detection score for the one or more sets of files exceeds a specified threshold. The alert may be transmitted by the security appliance to a network security system.

20 Claims, 2 Drawing Sheets

(51) Int. Cl.
*G06F 15/18* (2006.01)
*G06F 7/02* (2006.01)

(56) References Cited

U.S. PATENT DOCUMENTS

| | | | |
|---|---|---|---|
| 9,740,862 B1* | 8/2017 | Quinlan | G06F 21/562 |
| 2013/0145471 A1* | 6/2013 | Richard | G06F 21/562 |
| | | | 726/24 |
| 2016/0092684 A1* | 3/2016 | Langton | G06F 21/567 |
| | | | 726/23 |
| 2017/0024899 A1* | 1/2017 | Hammoud | H04W 4/025 |
| 2017/0163675 A1* | 6/2017 | Warman | H04L 63/1425 |
| 2018/0013772 A1* | 1/2018 | Schmidtler | H04L 63/1416 |

* cited by examiner

AUTOMATED DETECTION AND REMEDIATION OF RANSOMWARE ATTACKS INVOLVING A STORAGE DEVICE OF A COMPUTER NETWORK

FIELD

The field relates generally to computer networks, and more particularly to techniques for providing security in a computer network.

BACKGROUND

A computer network is typically configured to incorporate security functionality in order to protect the computers of the network against malicious activity. Such malicious activity can include, for example, ransomware attacks in which malware infecting one or more computers of the computer network will systematically encrypt files on those computers and possibly other computers of the network. The attacker withholds the corresponding decryption key unless a ransom is paid by the victim. Conventional techniques for combatting ransomware attacks can be problematic in that such techniques can take an unduly long amount of time to detect an attack in progress. The longer it takes to detect the attack, the greater the number of files that are encrypted, and the greater the adverse impact of the attack on the victim.

SUMMARY

Illustrative embodiments of the invention provide techniques for automated detection and remediation of ransomware attacks involving one or more storage devices of a computer network. For example, some embodiments are configured to provide particularly accurate and efficient detection of on-going ransomware attacks by interacting directly with storage devices rather than user devices. One or more of these embodiments are illustratively configured to detect ransomware activity using file inspection and associated behavioral analysis based on direct interaction with one or more storage devices. Such behavioral analysis is also referred to herein as "backend" behavioral analysis as it is focused on the storage device rather than on "frontend" components such as associated user devices.

In one embodiment, an apparatus comprises a security appliance having a processor coupled to a memory. The security appliance is associated with at least one storage device and comprises a ransomware detector configured to generate a detection score for one or more sets of files stored in the storage device. The detection score illustratively reflects the likelihood that a ransomware attack is in progress.

The ransomware detector in this embodiment comprises a file analyzer configured to compare characteristics relating to a current state of the files with information stored in a file history database. Such analysis can be based at least in part on characteristics of the file such as metadata of the file or its corresponding directory, and its relationships to other files. The ransomware detector additionally comprises a detection score generator having a weighting module for applying weights to respective comparison results from the file analyzer in generating the detection score for the one or more sets of files. The ransomware detector is further configured to generate an alert if the detection score for the one or more sets of files exceeds a specified threshold.

The alert may be transmitted by the security appliance to a security agent device or other type of processing device of a network security system.

Additionally or alternatively, the security appliance may be configured to take one or more remedial actions responsive to generation of the alert by the ransomware detector. Such remedial actions illustratively include capturing a cryptographic key utilized in an on-going ransomware attack.

In some embodiments, the storage device is accessible to at least one user device over a network and the ransomware detector operates out-of-band relative to the user device such that no component of the ransomware detector is implemented on the user device.

The security appliance may be configured to controllably switch the ransomware detector between multiple distinct operating modes. Examples of such operating modes illustratively include a real-time processing mode in which the ransomware detector receives copies of respective ones of the files from the storage device in conjunction with the respective ones of the files being stored in the storage device, a scheduled direct access processing mode in which the ransomware detector accesses the storage device to identify and analyze at least a subset of the files that have been modified since a previous access by the ransomware detector to the storage device, and a transparent processing mode in which the ransomware detector processes the files in a manner transparent to the storage device as the files are provided to the storage device for storage therein.

A given security appliance configured with functionality for automated detection and remediation of ransomware may be implemented, for example, in association with one or more storage devices of a computer network, possibly as part of a security analytics system or other type of network security system associated with the computer network.

These and other illustrative embodiments include, without limitation, methods, apparatus, systems, computer networks and computer program products comprising processor-readable storage media.

DETAILED DESCRIPTION

Illustrative embodiments of the present invention will be described herein with reference to exemplary computer networks and associated computers, storage devices, security appliances and other types of processing devices. It is to be appreciated, however, that the invention is not restricted to use with the particular illustrative computer network and processing device configurations shown. Accordingly, the term "computer network" as used herein is intended to be broadly construed, so as to encompass, for example, any system comprising multiple networked processing devices.

Figure 1:
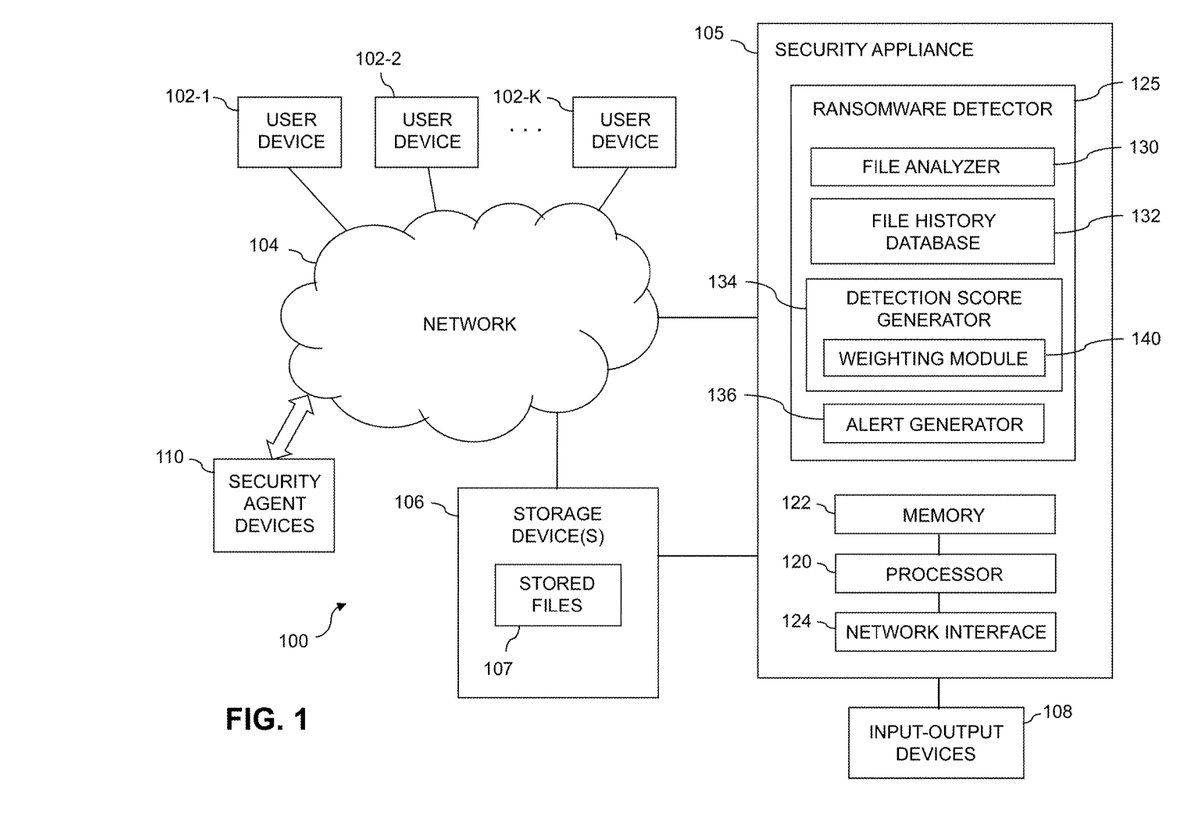
FIG. 1 is a block diagram of a computer network comprising a security appliance configured for automated detection and remediation of ransomware attacks in an illustrative embodiment of the invention.

FIG. 1 shows a computer network 100 configured in accordance with an illustrative embodiment of the invention. The computer network 100 comprises a plurality of user devices 102-1, 102-2, ... 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a security appliance 105.

The user devices 102 may comprise, for example, mobile telephones, laptop computers, tablet computers, desktop computers or other types of devices capable of supporting user access to network resources. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Also included in the computer network 100 is at least one storage device 106 comprising stored files 107. Although element 106 may comprise multiple distinct storage devices, it will be used in subsequent description herein to refer to a single storage device. The storage device 106 is coupled to the network 104 and to the security appliance 105. The storage device 106 in the present embodiment is implemented using one or more storage systems associated with the security appliance 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment.

The storage device 106 can illustratively comprise a single storage array, storage disk, storage drive or other type of storage device within the computer network 100. Alternatively, the storage device 106 can comprise one or more storage systems each having multiple storage devices implemented therein. The term "storage device" as used herein is therefore intended to be broadly construed. In some embodiments, a storage device may comprise a network share or possibly even an attached device such as a USB stick. Accordingly, in some embodiments, the storage device 106 may be attached to one or more of the user devices 102 in addition to or in place of being attached to the network 104. The stored files on the storage device may already be encrypted using a legitimate encryption process implemented by the user to protect the stored files from unauthorized access.

Although shown as separate from the storage device 106 in FIG. 1, the security appliance 105 in other embodiments can be implemented at least in part internally to the storage device 106. Accordingly, the security appliance 105 can be implemented externally to the storage device 106, as illustrated in the figure, or at least in part internally to the storage device 106. These arrangements are considered examples of different ways that the security appliance 105 may be "associated with" the storage device 106.

In some embodiments, the security appliance 105 is co-located with the storage device 106, for example, within a particular data center or other facility of a given enterprise. Alternatively, the security appliance 105 may be implemented in cloud infrastructure that is remote from the storage device 106.

Also associated with the security appliance 105 are input-output devices 108, which illustratively comprise keyboards, displays or other types of input-output devices in any combination. Such input-output devices are used to support one or more user interfaces to the security appliance 105, as well as to support communication between the security appliance 105 and other related systems and devices not explicitly shown.

In the present embodiment, alerts generated by the security appliance 105 are provided over the network 104 to one or more security agent devices 110. Such devices, like the user devices 102, can illustratively comprise mobile telephones, laptop computers, tablet computers, desktop computers, or other types of computers or processing devices configured for communication over network 104 with the security appliance 105. For example, a given security agent device can comprise a mobile telephone equipped with a mobile application configured to receive alerts from the security appliance 105 and to provide an interface for a security agent to select particular remedial measures for responding to the alert.

Examples of such remedial measures may include turning off, disconnecting or otherwise disabling or quarantining one or more of the user devices 102 that are determined to be likely to be infected with ransomware. Other types of remedial measures may include attempting to capture a cryptographic key utilized in an on-going ransomware attack.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

In addition, user device agents may be associated with respective ones of at least a subset of the user devices 102. Such user agents can be configured to interact with the security appliance 105 in order to assist in the detection of ransomware within the computer network 100 using the techniques disclosed herein.

Illustrative examples of agents that can be used in some embodiments include agents implementing at least a portion of the functionality of an Enterprise Compromise Assessment Tool (ECAT), commercially available from RSA, The Security Division of EMC Corporation of Hopkinton, Mass.

The security appliance 105 in the FIG. 1 embodiment is assumed to be implemented using at least one processing device. Each such processing device generally comprises at least one processor and an associated memory, and implements one or more functional modules for controlling certain features of the security appliance 105.

More particularly, the security appliance 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the security appliance 105 to communicate over the network 104 with the user devices 102, the storage device 106 and the security agent devices 110, and illustratively comprises one or more conventional transceivers.

The security appliance 105 in the present embodiment further comprises a ransomware detector 125 configured to generate a detection score for one or more sets of files stored in the storage device 106. The one or more sets of files illustratively comprise at least a subset of the stored files 107.

In some embodiments, the ransomware detector 125 is configured to detect ransomware activity using file inspection and associated behavioral analysis based on direct interaction with the storage device 106. Such behavioral analysis is also referred to herein as "backend" behavioral analysis as it is focused on the storage device 106 rather than on "frontend" components such as the user devices 102.

The ransomware detector 125 in the present embodiment is assumed to be configured to detect a ransomware attack while the attack is still in progress. For example, the object of the ransomware detector 125 may be to identify the attack as quickly as possible in order to minimize the damage to the stored files 107. The ransomware detector in this embodiment need not detect the original infection.

The ransomware detector 125 comprises a file analyzer 130, a file history database 132, a detection score generator 134 and an alert generator 136.

The file analyzer 130 is configured to compare characteristics relating to a current state of the files with information stored in the file history database 132.

For example, the file analyzer 130 in some embodiments inspects files as they are stored on the storage device 106 and/or by direct access inspection on the storage device 106. Analysis is then performed on each file by comparing a current state of the file to its history as maintained in the file history database 132. Additional or alternative information that can be used in the analysis includes characteristics of the file, such as metadata of the file or its corresponding directory, and its relationships to other files. Combined information for multiple files can also be used, such as overall file change rate for a designated set of files.

The detection score generator 134 comprises a weighting module 140 for applying weights to respective comparison results from the file analyzer 130 in generating the detection score for the one or more sets of files. Each such comparison result may correspond to a different comparison metric or criteria utilized to assess the likelihood that a ransomware attack is in progress. The detection score therefore reflects the likelihood that a ransomware attack is in progress.

It should be noted that a given "set of files" as that term is used herein may include only a single file or multiple files. A composite detection scores can be generated for a single file by combining individual scores generated for that file using different evaluation methods. Composite detection scores over multiple files can additionally or alternatively be generated, possibly by combining composite detection scores from respective single files.

The alert generator 136 is configured to generate an alert if the detection score for the one or more sets of files exceeds a specified threshold. Such an alert may be transmitted by the security appliance 105 via network interface 124 over network 104 to one of the security agent devices 110 or to another processing device of a network security system.

At least portions of one or more of the components 130, 132, 134 and 136 of the ransomware detector 125 may be implemented at least in part in the form of software that is stored in memory 122 and executed by processor 120.

In some embodiments, the security appliance 105 comprising the ransomware detector 125 is configured to take one or more remedial actions responsive to generation of the alert by the alert generator 136. As indicated previously, such remedial actions may illustratively include capturing a cryptographic key utilized in an on-going ransomware attack. Such a cryptographic key may comprise an encryption key in a symmetric key ransomware attack in which the same key used to encrypt files can also be used to decrypt files. Alternatively, a captured encryption key may be processed using cryptanalysis to obtain a corresponding decryption key in an asymmetric key ransomware attack.

The security appliance 105 illustratively operates out-of-band relative to the user devices 102 such that no component of the ransomware detector 125 is implemented on any one of the user devices 102. For example, the ransomware detector 125 in the present embodiment does not require a user device agent or application component in order to detect an on-going ransomware attack. This is in contrast to conventional arrangements in which implementation of ransomware detection functionality requires at least some modification of user devices or at least software components of such devices.

However, it is possible in some embodiments that one or more of the user devices 102 may each comprise a user device agent. Such user device agents can provide hints or other information to assist the ransomware detector 125 in its detection operations. As noted above, agents of this type can be configured to include ECAT functionality.

The file analyzer 130 of the ransomware detector 125 in some embodiments processes files substantially contemporaneously with the files being stored in the storage device 106 by one or more of the user devices 102 coupled to the storage device 106 over the network 104. As noted above, the processed files illustratively include at least a subset of the stored files 107 of the storage device 106. The files in some cases may be processed prior to or in conjunction with their storage in the storage device 106.

For example, the ransomware detector 125 is illustratively operative in a real-time processing mode in which the ransomware detector 125 receives copies of respective ones of the files from the storage device 106 in conjunction with the respective ones of the files being stored in the storage device 106.

Such a real-time processing mode can operate on-demand in conjunction with the normal storage of user files on the storage device 106. For example, the storage device 106 can copy a given file that is sent to it by one of the user devices 102 for storage and provide the copy of the file to the ransomware detector 125 for analysis, possibly via a service chain of the type utilized by a storage device when calling an external process. The performance impact is minimal as the storage device simply has to generate and provide the copy but does not have to wait for a return code or similar response from the security appliance 105. The security appliance 105 can delete the copy after the ransomware detector 125 has completed its analysis of the copy.

Numerous additional or alternative processing modes are possible for the ransomware detector 125, and the security appliance 105 may be configured to controllably switch the ransomware detector 125 between such multiple modes.

Other examples of processing modes for the ransomware detector 125 include a scheduled direct access processing mode and a transparent processing mode.

In the scheduled direct access processing mode, the ransomware detector 125 accesses the storage device 106 to identify and analyze at least a subset of the files that have been modified since a previous access by the ransomware detector 125 to the storage device 106. Such access by the ransomware detector 125 to the storage device 106 may be via the network 104 or direct access via a connection that bypasses the network 104.

By way of example, in one possible implementation of the scheduled direct access processing mode, the ransomware detector 125 directly accesses the storage device on a periodic basis. It "walks" the entire storage device and inspects files that have been changed since the last invocation. Such an arrangement is more likely to impact performance and so may be scheduled to run outside of normal business hours. This mode allows the ransomware detector 125 to "macro" inspect across multiple sets of files.

In the transparent processing mode, the ransomware detector 125 processes the files in a manner transparent to the storage device 106, as the files are provided to the storage device 106 for storage therein. For example, the files may be provided to the storage device 106 from the user devices 102, with the ransomware detector 125 in effect being placed in-line with the data path between the user devices 102 and the storage device 106, or possibly receiving copies of the files via a tap from that data path. In such arrangements, the ransomware detector 125 analyzes the files as they are provided to the storage device 106 but without the storage device 106 necessarily being aware that the ransomware detector 125 is doing so.

The file analyzer 130 in comparing characteristics relating to the current state of the files with information stored in the file history database 132 illustratively applies a plurality of evaluation criteria to a given one of the files to obtain individual comparison results for respective ones of the evaluation criteria for the given file. Such file analysis performed individually over multiple files can be combined and used to generate one or more combined comparison results for the multiple files.

As mentioned previously, the weighting module 140 of the detection score generator 134 applies weights to respective comparison results from the file analyzer 130 in generating the detection score for the one or more sets of files. For example, different weights may be applied to respective comparison results that are generated using respective different comparison metrics or criteria. Accordingly, a given file or set of files can be compared against multiple distinct metrics or other criteria that are indicative of the presence of a ransomware attack, and the corresponding comparison results weighted in accordance with the respective reliabilities of the multiple distinct metrics or other criteria in predicting the presence of ransomware.

For example, in one possible implementation, the ransomware detector 125 performs several processing operations on each of a plurality of files in order to generate for each of the files a detection score that provides a measure of the confidence that the file has been modified by ransomware. This illustratively includes applying a series of evaluation methods each based on a different comparison metric or other criteria and generating an individual score for each evaluation method. The individual scores are combined using respective weights to obtain a detection score for the file. Multiple such scores can be combined for a set of files to obtain a detection score for that set of files.

The evaluation methods in some embodiments can include one or more evaluation methods that are performed externally to the ransomware detector, such as external processes or external determinants, possibly implemented in another processing device of the computer network 100. For example, such external processes or external determinants can be used to determine if files are being modified in accordance with respective specific known ransomware variants. The ransomware detector 125 can then be configured to perform particular types of remediation based on detection of the presence of a particular ransomware variant. Such remediation can include performing a particular key capture or key recovery algorithm that is known to be suitable for use with the particular ransomware variant.

Examples of the above-noted evaluation methods that may be implemented by the ransomware detector 125 include methods for detecting occurrence of the following events:

1. Events based on unexpected name change
   a. File name change b. File name change, including creation or deletion of file name, using a known ransomware variant
2. Events based on changes to a directory
a. Significant change in rate of file creations and deletions within a directory
b. Unexpected file changes in a "stale" directory
c. Deviation from expected file changes (e.g., set or linked behavior)
3. Events based on file header anomalies
a. Change in "magic" number of a file
b. File magic number does not match file extension
c. File header becomes unreadable
d. Structure content is inconsistent with file type
e. Data content is inconsistent with schema (e.g., JSON, XML)
4. Events based on statistical content analysis
a. Histogram analysis inconsistent with historical expectations
b. Sparse data ratio change >1 standard deviation (SD)
c. File has reduced or unexpected compression ratio
d. File has a reduced or unexpected de-duplication ratio
e. Readable content indexing >1 SD
5. Events based on file type changes
a. Hash value of a file changes when file type indicates static file (e.g., .jpg, .mp3)
b. File size changes when file type indicates a static file
6. Events based on overall change rate
a. File change rate >1 SD
b. Unexpected file change behavior (e.g., sequential/parallel)
7. Other events
a. File has an injected value that is not present on storage
b. Change in stored hash value for a file A given implementation of the ransomware detector 125 can incorporate any subset of the above-listed detection examples, as well as additional or alternative evaluation methods. One or more of the examples above can be implemented at least in part using an external process, such as the detection of a reduced or unexpected compression ratio or de-duplication ratio, or the detection of a readable content indexing. These evaluation methods are examples of what are more generally referred to herein as comparisons of characteristics of a current state of a file or files with information stored in a file history database.

The file history database 132 is updated with comparison results from the evaluation methods as well as associated individual and composite detection scores and corresponding information such as file metadata and file relationships.

The alert generator 136 is configured to compare the detection score to a threshold, and to generate an alert if the detection score is found to exceed the specified threshold. By way of example, the alert in the present embodiment may be transmitted via the network interface 124 over the network 104 to a security agent associated with one of the security agent devices 110. In other embodiments, multiple alerts of different types can be generated relating to the current access.

It is to be appreciated that this particular arrangement of components 130, 132, 134 and 136 illustrated in the ransomware detector 125 of the FIG. 1 embodiment is presented by way of example only, and alternative arrangements can be used in other embodiments. Moreover, the particular set of computer network elements shown in the embodiment of FIG. 1 for automatically detecting and remediating ransomware attacks involving one or more storage devices is presented by way of illustrative example only, and in other embodiments additional or alternative computer network elements may be used. Thus, another embodiment may include additional or alternative systems, devices and other network entities, as well as different arrangements of modules and other components.

By way of example, in other embodiments, the security appliance 105 can be implemented in a distributed manner, with particular modules or other components thereof being distributed over multiple processing devices of the computer network 100.

In some embodiments, the security appliance 105 is a part of or otherwise associated with another system, such as, for example, a security operations center (SOC) or a critical incident response center (CIRC).

Additionally or alternatively, the security appliance 105 can be part of or incorporate an otherwise conventional security analytics system, such as the RSA Security Analytics system commercially available from RSA, The Security Division of EMC Corporation of Hopkinton, Mass.

Other embodiments can implement the security appliance 105 and its associated ransomware detector 125 as part of or in conjunction with a security information and event management (SIEM) system, such as an enVision® platform, also commercially available from RSA. Such an SIEM system is also considered another possible example of a "network security system" as that term is broadly used herein.

An exemplary process utilizing ransomware detector 125 of the security appliance 105 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 210. These steps are assumed to be performed at least in part by the ransomware detector 125 utilizing its modules 130, 132, 134 and 136, possibly operating in conjunction with other computer network components, although the process can be applied in other types of computer networks.

In step 200, a security appliance is associated with at least one storage device. Such an association can be established, for example, by incorporating the security appliance into the storage device, or by establishing a connection between the security appliance and the storage device over a network. It is also possible that a single security appliance can be associated with multiple storage devices, or that a given computer network can include multiple security appliances, each associated with a different one of the multiple storage devices. Numerous alternative types of associations between one or more security appliances and one or more storage devices can be established in a given embodiment.

In step 202, a ransomware detector is configured in the security appliance. For example, a ransomware detector can be configured to include a file analyzer, file history database, detection score generator and alert generator as in the illustrative embodiment of FIG. 1. In conjunction with such a configuration, weights may be established for application to respective comparison results in a weighting module of the detection score generator. Parameters such as the particular comparison metrics or other criteria to be utilized by the ransomware detector can be at least partially determined in this step. It is assumed for purposes of this embodiment that the storage device is accessible to at least one user device over a network and further that the ransomware detector operates out-of-band relative to the user device in that no component of the ransomware detector is implemented on the user device.

In step 204, a detection score is generated in the ransomware detector for one or more sets of files stored in the storage device. The generation of a detection score in this embodiment illustratively involves comparing characteristics relating to a current state of the files with information stored in a file history database, applying weights to respective comparison results, and generating the detection score based at least in part on the weighted comparison results. The detection score illustratively indicates the degree to which the current state of the files deviates from normal behavior for those files as reflected in the file history database. Additional or alternative factors or characteristics may be taken into account in identifying such a behavioral deviation indicative of the presence of a ransomware attack.

The file analysis applied in generating the detection score in step 204 can be based at least in part on characteristics of the file, such as metadata of the file or its corresponding directory, and its relationships to other files. Such information is assumed to be encompassed by the term "characteristics relating to a current state of the files," as that term is intended to be broadly construed herein. Also, a "file history database" as the term is used herein is similarly intended to be broadly construed to encompass any arrangement of stored file characteristic information suitable for use in file analysis. Thus, file history information should not be construed as being limited to any particular format.

Detection scores determined for individual files or sets of files using particular comparison metrics or other criteria may be aggregated into a composite detection score by application of appropriate weights to the individual scores generated using each metric or other criteria. Each such individual score illustratively corresponds to a feature extracted from the one or more files where the feature has a corresponding reliability in terms of predicting the presence of a ransomware attack. The above-noted weights are applied to respective extracted features in generating the composite detection score.

For example, individual scores generated using different evaluation methods of the type described previously can each be weighted and combined into a composite detection score. The weight applied to a given individual score generated using one of the evaluation methods represents the likelihood or probability that the corresponding extracted feature is indicative of a ransomware attack. Features associated with high levels of false positives may be assigned lower weights than other features. For example, an unexpectedly high rate of file changes within the stored files could be indicative of a user simply cleaning up or reorganizing the files. Such a detected feature should therefore be appropriately weighted in combination with other features in computing a composite detection score.

As a more particular example, assume that the ransomware detector 125 detects a change in a spreadsheet file that had not previously been modified. Although this alone would not be considered sufficient to generate an alert, it could contribute to a composite detection score. Further assume that the ransomware detector 125 additionally detects that the file header of the spreadsheet file is now unreadable. These two detected features when combined into a composite detection score could be sufficient to trigger an alert, depending on implementation-specific factors such as the applied weights and the alert threshold.

In step 206, a determination is made as to whether or not the detection score exceeds a specified threshold. As noted above, the detection score illustratively comprises a composite detection score generated by weighting individual scores derived using different comparison metrics or other criteria. If the detection score exceeds the threshold, the process moves to step 208, and otherwise moves to step 210. The threshold is illustratively configurable via an interface associated with one of the input-output devices 108.

In step 208, an alert is generated and provided to a security agent and one or more automated remedial actions are taken. For example, the alert may be transmitted over the network 104 to one of the security agent devices 110. Alerts can be generated using any of a wide variety of different formats and protocols. These include, for example, SMTP, rSyslog, XML, FTP and custom API scripts.

In place of or in addition to transmission of an alert to a security agent device, automated processing may be applied to an alert in at least one processing device of an SOC, CIRC, SIEM system, or other type of network security system. Alerts can therefore be used to trigger actions such as generation of a security ticket or transmission to an incident response team or associated console or application.

The automated remedial actions can illustratively include, for example, quarantining one or more of the user devices 102 that are suspected as being infected with ransomware, or attempting to capture a cryptographic key utilized to encrypt files as part of an on-going ransomware attack.

In some embodiments, multiple alerts can be generated, possibly based on comparisons of the composite detection score or one or more portions thereof to different thresholds. Accordingly, multiple alerts can be generated relative to respective different thresholds and subject to different types of processing in some embodiments.

In step 210, the file history database is updated based on the detection score and threshold comparisons. The updated file history database is then utilized in subsequent iterations of the process.

Although not illustrated in the figure, machine learning functionality may be incorporated into the security appliance in order to learn which comparison metrics or other criteria are best at predicting ransomware attacks. Such machine learning functionality can utilize feedback received from security personnel that indicates whether or not a given generated alert was actually indicative of a real ransomware attack.

As mentioned previously, the ransomware detector of the security appliance may be switchable between multiple operating modes, illustratively including one or more of the following operating modes:

1. A real-time processing mode in which the ransomware detector receives copies of respective ones of the files from the storage device in conjunction with the respective ones of the files being stored in the storage device.

2. A scheduled direct access processing mode in which the ransomware detector accesses the storage device to identify and analyze at least a subset of the files that have been modified since a previous access by the ransomware detector to the storage device.

3. A transparent processing mode in which the ransomware detector processes the files in a manner transparent to the storage device as the files are provided to the storage device for storage therein.

Again, these are just examples of different operating modes for the ransomware detector, and additional or alternative modes can be used in other embodiments. Also, a ransomware detector in some embodiments is configured to operate in only a single mode, and is not switchable between multiple modes.

Figure 2:
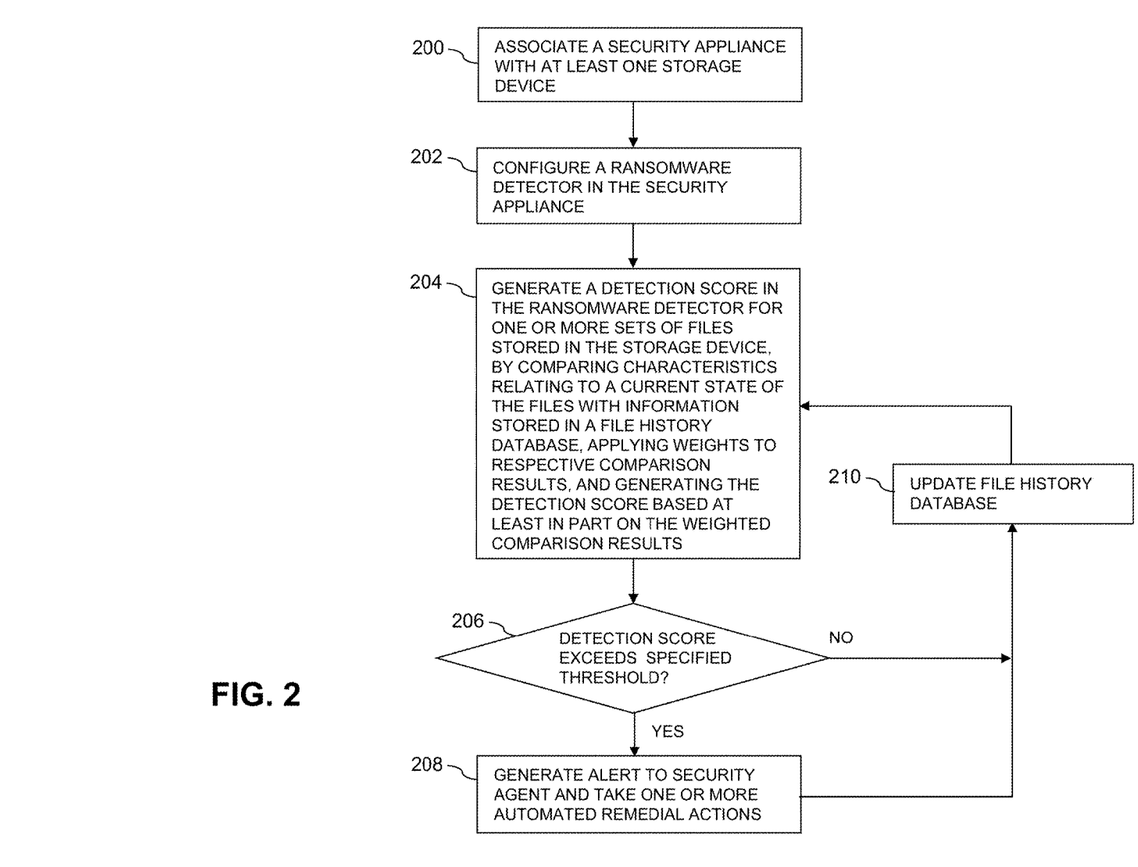
FIG. 2 is a flow diagram of a process for automated detection and remediation of ransomware attacks in an illustrative embodiment.

It should be understood that additional instances of steps 200 through 210 of the FIG. 2 process can be performed for different sets of files, possibly on different storage devices, or may otherwise be repeated periodically in order to ensure that ransomware attacks are accurately and efficiently detected within the computer network 100.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect ransomware attacks and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of ransomware attack detection for different sets of files or different storage devices.

The above-described illustrative embodiments provide significant advantages relative to conventional approaches.

For example, some embodiments are configured to provide particularly accurate and efficient detection of on-going ransomware attacks by interacting directly with storage devices rather than user devices. Such "backend" behavioral analysis advantageously allows for earlier detection of on-going ransomware attacks than would otherwise be possible using conventional techniques, thereby helping to minimize the damage that the ransomware attack can inflict on the computer network.

Early detection of an on-going ransomware attack using the techniques disclosed herein not only limits the extent of the damage to the stored files but can in some cases allow the cryptographic key being used in the attack to be captured.

In addition, the ransomware detection can be implemented in illustrative embodiments without any modification to user devices or their associated applications.

Furthermore, a security appliance comprising a ransomware detector as disclosed herein can be configured to call external processes and to incorporate their responses into a composite detection score. Such an arrangement can further increase the accuracy of the determination as to whether or not a ransomware attack is in progress.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements.

The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRail™, VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, storage devices, security appliances and other types of processing devices.

The processing devices and other computer network components referred to herein can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of security appliances, storage devices, modules, comparison metrics and other criteria, thresholds, alerts and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. An apparatus comprising:
a security appliance comprising a processor coupled to a memory;
the security appliance being associated with at least one storage device;
wherein the security appliance comprises a ransomware detector configured to generate a detection score for one or more sets of files stored in the storage device;
the ransomware detector comprising:
a file analyzer for comparing characteristics relating to a current state of the files with information stored in a file history database, the information stored in the file history database comprising characteristics relating to a previous state of the files prior to a time associated with the current state, the characteristics comprising for a first one of the one or more sets of files at least one of metadata of at least one file of the first set, a relationship of at least one file of the first set to one or more other files, and a rate of change of multiple files of the first set; and
a detection score generator having a weighting module for applying weights to respective comparison results from the file analyzer in generating the detection score for the one or more sets of files;
a given one of the comparison results from the file analyzer comprising a result of comparing a particular one of the characteristics for the current state of one or more designated ones of the files with the particular characteristic for the previous state of the one or more designated ones of the files;
wherein the ransomware detector is further configured to generate an alert if the detection score for the one or more sets of files exceeds a specified threshold.

2. The apparatus of claim 1 wherein the alert is transmitted by the security appliance over a network to a processing device of a network security system.

3. The apparatus of claim 1 wherein the security appliance comprising the ransomware detector is configured to take one or more remedial actions responsive to generation of the alert by the ransomware detector including capturing a cryptographic key utilized in an on-going ransomware attack.

4. The apparatus of claim 1 wherein the security appliance comprising the ransomware detector is implemented externally to the storage device.

5. The apparatus of claim 1 wherein the security appliance comprising the ransomware detector is implemented at least in part internally to the storage device.

6. The apparatus of claim 1 wherein the storage device is accessible to at least one user device over a network and further wherein the ransomware detector operates out-of-band relative to the user device such that no component of the ransomware detector is implemented on the user device.

7. The apparatus of claim 1 wherein the security appliance comprising the ransomware detector is co-located with the storage device.

8. The apparatus of claim 1 wherein the security appliance comprising the ransomware detector is implemented in cloud infrastructure remote from the storage device.

9. The apparatus of claim 1 wherein the file analyzer of the ransomware detector processes the files substantially contemporaneously with the files being stored in the storage device by one or more user devices coupled to the storage device over a network.

10. The apparatus of claim 1 wherein the ransomware detector is operative in a real-time processing mode in which the ransomware detector receives copies of respective ones of the files from the storage device in conjunction with the respective ones of the files being stored in the storage device.

11. The apparatus of claim 1 wherein the ransomware detector is operative in a scheduled direct access processing mode in which the ransomware detector accesses the storage device to identify and analyze at least a subset of the files that have been modified since a previous access by the ransomware detector to the storage device.

12. The apparatus of claim 1 wherein the ransomware detector is operative in a transparent processing mode in which the ransomware detector processes the files in a manner transparent to the storage device as the files are provided to the storage device for storage therein.

13. The apparatus of claim 1 wherein the file analyzer in comparing characteristics relating to the current state of the files with information stored in the file history database applies a plurality of evaluation criteria to a given one of the files to obtain individual comparison results for respective ones of the evaluation criteria for the given file.

14. The apparatus of claim 1 wherein the file analyzer in comparing characteristics relating to the current state of the files with information stored in the file history database performs combined analysis over multiple ones of the files and generates one or more combined comparison results for the multiple files.

15. A method comprising:
associating a security appliance with at least one storage device;
configuring a ransomware detector in the security appliance;
generating a detection score in the ransomware detector for one or more sets of files stored in the storage device; and
generating an alert if the detection score for the one or more sets of files exceeds a specified threshold;
wherein generating the detection score comprises:
comparing characteristics relating to a current state of the files with information stored in a file history database, the information stored in the file history database comprising characteristics relating to a previous state of the files prior to a time associated with the current state, the characteristics comprising for a first one of the one or more sets of files at least one of metadata of at least one file of the first set, a relationship of at least one file of the first set to one or more other files, and a rate of change of multiple files of the first set;
applying weights to respective comparison results; and
generating the detection score based at least in part on the weighted comparison results;
a given one of the comparison results comprising a result of comparing a particular one of the characteristics for the current state of one or more designated ones of the files with the particular characteristic for the previous state of the one or more designated ones of the files;
wherein the security appliance is implemented by at least one processing device comprising a processor coupled to a memory.

16. The method of claim 15 wherein the storage device is accessible to at least one user device over a network and further wherein the ransomware detector operates out-ofband relative to the user device such that no component of the ransomware detector is implemented on the user device.

17. The method of claim 15 further comprising controllably switching the ransomware detector between a plurality of different operating modes wherein the operating modes comprise two or more of:
- a real-time processing mode in which the ransomware detector receives copies of respective ones of the files from the storage device in conjunction with the respective ones of the files being stored in the storage device;
- a scheduled direct access processing mode in which the ransomware detector accesses the storage device to identify and analyze at least a subset of the files that have been modified since a previous access by the ransomware detector to the storage device; and
- a transparent processing mode in which the ransomware detector processes the files in a manner transparent to the storage device as the files are provided to the storage device for storage therein.

18. A computer program product comprising a non-transitory processor-readable storage medium having stored therein program code of one or more software programs, wherein the program code when executed by at least one processing device causes said at least one processing device:
- to associate a security appliance with at least one storage device;
- to configure a ransomware detector in the security appliance;
- to generate a detection score in the ransomware detector for one or more sets of files stored in the storage device; and
- to generate an alert if the detection score for the one or more sets of stored files exceeds a specified threshold;

wherein generating the detection score comprises:
comparing characteristics relating to a current state of the files with information stored in a file history database, the information stored in the file history database comprising characteristics relating to a previous state of the files prior to a time associated with the current state, the characteristics comprising for a first one of the one or more sets of files at least one of metadata of at least one file of the first set, a relationship of at least one file of the first set to one or more other files, and a rate of change of multiple files of the first set;
applying weights to respective comparison results; and
generating the detection score based at least in part on the weighted comparison results;
a given one of the comparison results comprising a result of comparing a particular one of the characteristics for the current state of one or more designated ones of the files with the particular characteristic for the previous state of the one or more designated ones of the files.

19. The computer program product of claim 18 wherein the storage device is accessible to at least one user device over a network and further wherein the ransomware detector operates out-of-band relative to the user device such that no component of the ransomware detector is implemented on the user device.

20. The computer program product of claim 18 wherein the program code when executed by at least one processing device further causes said at least one processing device to controllably switch the ransomware detector between a plurality of different operating modes wherein the operating modes comprise two or more of:
- a real-time processing mode in which the ransomware detector receives copies of respective ones of the files from the storage device in conjunction with the respective ones of the files being stored in the storage device;
- a scheduled direct access processing mode in which the ransomware detector accesses the storage device to identify and analyze at least a subset of the files that have been modified since a previous access by the ransomware detector to the storage device; and
- a transparent processing mode in which the ransomware detector processes the files in a manner transparent to the storage device as the files are provided to the storage device for storage therein.

* * * * *